United States Patent
Sulahian

(10) Patent No.: US 7,452,036 B1
(45) Date of Patent: Nov. 18, 2008

(54) VEHICLE WHEEL ASSEMBLY WITH TRANSITION RING MEMBER

(76) Inventor: Diko Sulahian, 12717 Ann St., Santa Fe Springs, CA (US) 90670-2971

( * ) Notice: Subject to any disclaimer, the term of this patent is extended or adjusted under 35 U.S.C. 154(b) by 0 days.

(21) Appl. No.: 12/105,393

(22) Filed: Apr. 18, 2008

(51) Int. Cl.
*B60B 7/01* (2006.01)
(52) U.S. Cl. ............. 301/37.24; 301/37.11; 301/37.108
(58) Field of Classification Search ............... 301/5.21, 301/5.22, 37.101, 37.102, 37.22, 37.23, 37.24, 301/37.11, 37.32, 37.34, 37.108, 37.109, 301/37.43, 65, 95.101, 63.108, 95.107; 359/522, 359/524; 362/500; D12/204, 208, 212; 280/160.1
See application file for complete search history.

(56) References Cited

U.S. PATENT DOCUMENTS

| | | | |
|---|---|---|---|
| 1,669,731 A * | 5/1928 | Ash ............................. 301/55 |
| 1,858,228 A * | 8/1932 | Lyon ........................... 152/406 |
| 1,971,604 A * | 8/1934 | Frank .......................... 301/36.1 |
| 1,982,106 A | 11/1934 | Hunt |
| 1,985,378 A | 12/1934 | Lyon |
| 1,993,813 A | 3/1935 | Rosa et al. |
| 2,231,932 A * | 2/1941 | Lyon ........................... 301/37.24 |
| 2,274,496 A | 2/1942 | Mulhern |
| 2,455,151 A | 11/1948 | Wood |
| 2,734,778 A * | 2/1956 | Cook ............................ 301/8 |
| 2,822,016 A * | 2/1958 | Billingsley .................. 152/523 |
| 3,083,060 A | 3/1963 | Mulhern |
| 3,517,968 A | 6/1970 | Tully et al. |
| 3,758,161 A * | 9/1973 | Bradley et al. ......... 301/63.104 |
| 3,798,728 A | 3/1974 | Beisch |
| 3,823,982 A | 7/1974 | Spisak |
| 3,827,756 A | 8/1974 | Mitchell |
| 3,891,276 A | 6/1975 | Spisak |
| D249,678 S * | 9/1978 | Rotheiser .................... D12/204 |
| 4,275,932 A * | 6/1981 | Baird et al. ................. 301/40.3 |
| 4,671,575 A | 6/1987 | Pfeiffer et al. |
| 4,720,149 A * | 1/1988 | Thissen et al. ............. 301/5.21 |
| 4,913,979 A | 4/1990 | Buerger |
| 5,273,345 A | 12/1993 | Baccman et al. |
| 5,441,334 A | 8/1995 | Botterman et al. |
| 5,967,212 A | 10/1999 | Hameed |
| 6,059,377 A * | 5/2000 | Wu ........................ 301/95.102 |
| 6,283,557 B1 * | 9/2001 | Okajima et al. ........ 301/95.104 |

(Continued)

FOREIGN PATENT DOCUMENTS

AU       2007101009 A4    11/2007

(Continued)

*Primary Examiner*—Russell D Stormer
(74) *Attorney, Agent, or Firm*—Berenato, White & Stavish

(57) ABSTRACT

A vehicle wheel assembly comprises a wheel having a central axis, an annular rim portion having outboard and inboard bead seats for mounting a pneumatic tire thereon and disk portion including a central hub portion provided with a plurality of lug mounting apertures. The rim portion defines an annular outboard and inboard rim flanges extending radially outwardly from the outboard and inboard bead seats, respectively. The outboard rim flange has an annular inner peripheral surface facing the inboard rim flange and an annular outer peripheral surface disposed opposite the inner peripheral surface and facing away from the inboard rim flange. The outboard rim flange has an annular retention groove formed on the outer peripheral surface of the outboard rim flange concentrically to the central axis. The wheel assembly further comprises an annular transition member mounted in the annular retention groove in the outboard rim flange of the wheel.

5 Claims, 8 Drawing Sheets

U.S. PATENT DOCUMENTS

| | | |
|---|---|---|
| 6,383,557 B1 * | 5/2002 | Smith .................... 427/140 |
| 6,481,804 B2 | 11/2002 | Tanghetti |
| 6,783,190 B1 * | 8/2004 | Baumgartner .......... 301/64.102 |
| 6,916,072 B2 | 7/2005 | Bernoni |
| 7,264,316 B2 | 9/2007 | DiMarco et al. |
| 7,296,860 B2 | 11/2007 | Dangleman |
| 2002/0113485 A1 | 8/2002 | Ketter |
| 2004/0021367 A1 | 2/2004 | Rumi et al. |
| 2004/0090110 A1 * | 5/2004 | Bernardi ................ 301/95.101 |
| 2005/0134108 A1 | 6/2005 | Chuang |
| 2007/0062040 A1 | 3/2007 | Coleman et al. |
| 2007/0120415 A1 | 5/2007 | Kang |
| 2008/0006358 A1 | 1/2008 | Tavin et al. |
| 2008/0018168 A1 * | 1/2008 | Conaway ................. 301/37.24 |

FOREIGN PATENT DOCUMENTS

| | | | |
|---|---|---|---|
| DE | 3640198 | * | 6/1988 |
| DE | 10 2005 054 137 A1 | | 5/2007 |
| EP | 0 062 130 A1 | | 10/1982 |
| GB | 2 403 696 | | 1/2005 |
| GB | 2 412 635 | | 10/2005 |
| GB | 2 426 491 A | | 11/2006 |
| GB | 2 433 057 A | | 6/2007 |
| JP | 2004-224272 | * | 1/2003 |
| WO | WO 2005/009761 A1 | | 2/2005 |
| WO | WO 2006/092269 A1 | | 9/2006 |

* cited by examiner

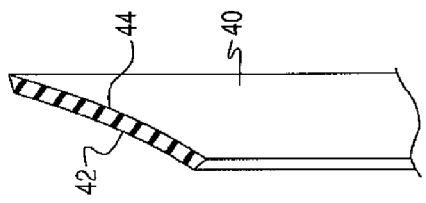
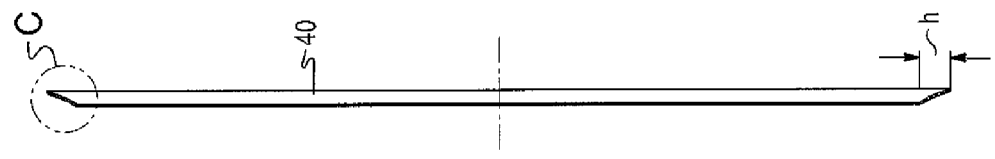
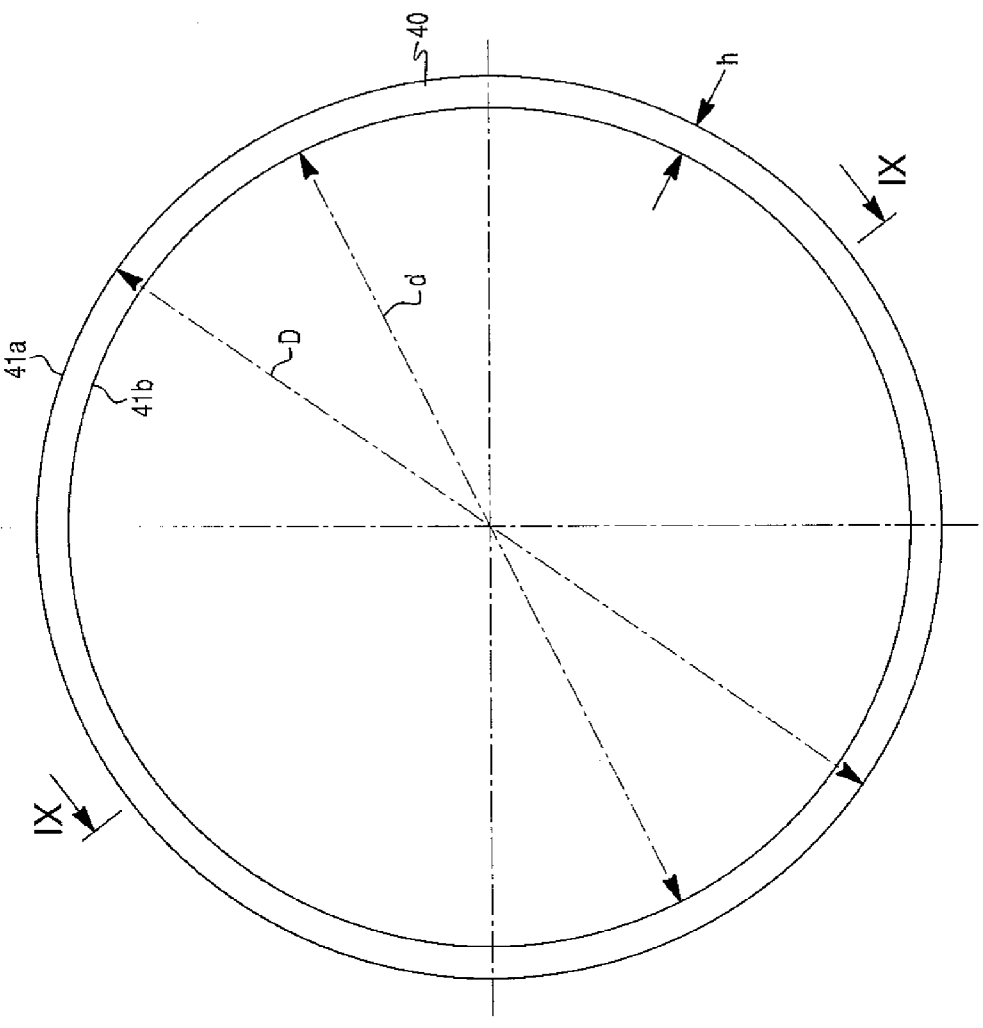

VEHICLE WHEEL ASSEMBLY WITH TRANSITION RING MEMBER

BACKGROUND OF THE INVENTION

1. Field of the Invention

The present invention relates to wheel assemblies for vehicles and more particularly, relates to a vehicle wheel assembly having a transition ring mounted to an outboard rim flange of a wheel.

2. Description of the Prior Art

FIGS. 1 and 2 show an aluminum wheel, more particularly, a one piece cast aluminum wheel, that includes a rim portion 1 and a disk portion 2. The disk portion 2 includes a plurality of spoke portions 3 and a central hub portion 4. A decoration hole 5 is formed between adjacent spoke portions 3. In the hub portion 4, a hub hole 6 is formed and a plurality of bolt holes 7 are circumferentially formed surrounding the hub hole 6. An outboard surface of the wheel, which is visible from the outside of a vehicle when the aluminum wheel is mounted to the vehicle, is typically covered by a center cap (not shown). A tire (not shown) is mounted to the rim portion 1 in a manner that is notoriously well known to those of skill in the art.

The need exists for a transition surface between the disk portion 2 with spoke portions 3 and the central hub portion 4 and the tire mounted to the rim portion.

SUMMARY OF THE INVENTION

The present invention provides a novel wheel assembly such as for a motor vehicle, comprising a wheel having a central axis, an annular rim portion having outboard and inboard bead seats for mounting a pneumatic tire thereon and a disk portion extending radially inwardly from the rim portion, and an annular transition member attached to the annular rim portion of the wheel concentrically to the central axis. In turn, the disk portion includes a central hub portion provided with a plurality of lug mounting apertures extending therethrough. The rim portion defines an annular outboard rim flange extending radially outwardly from the outboard head seat and an annular inboard rim flange extending radially outwardly from the inboard bead seat and disposed opposite the outboard rim flange. The outboard rim flange has an annular inner peripheral surface facing the inboard rim flange and an annular outer peripheral surface disposed opposite the inner peripheral surface and facing away from the inboard rim flange. Furthermore, the outboard rim flange has an annular retention groove formed on the outer peripheral surface of the outboard rim flange concentrically to the central axis. The annular transition member is mounted in the annular retention groove in the outboard rim flange of the wheel. Preferably, the annular transition member is adhered to the wheel rim by a removable adhesive. The annular transition member may be colored to enhance the visual appearance of the wheel and to improve driving safety.

BRIEF DESCRIPTION OF THE DRAWING

Objects and advantages of the invention will become apparent from a study of the following specification when viewed in light of the accompanying drawings, wherein:

FIG. 8 is a front view of an annular transition member according to the present invention;

FIG. 9 is a sectional view of the annular transition member taken along section line IX-IX in FIG. 8;

FIG. 10A is an exploded view of a cross section of the annular transition member shown in a circle "C";

DETAILED DESCRIPTION OF PREFERRED EMBODIMENT

Figure 1:
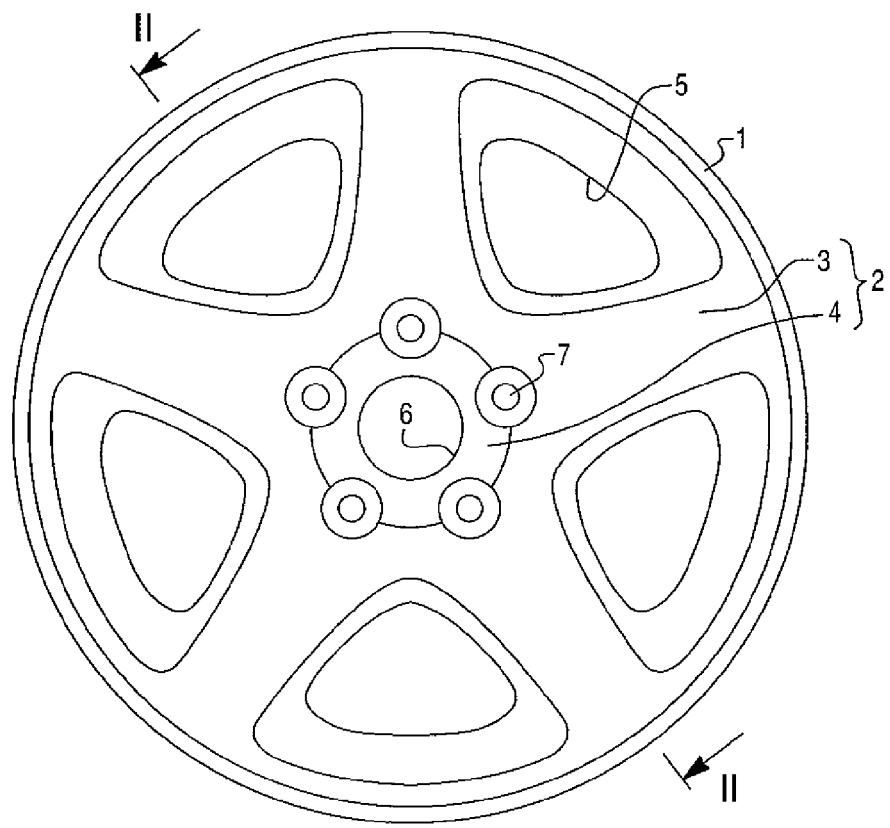
FIG. 1 shows a front view of a vehicle wheel of the prior art.
Figure 2:
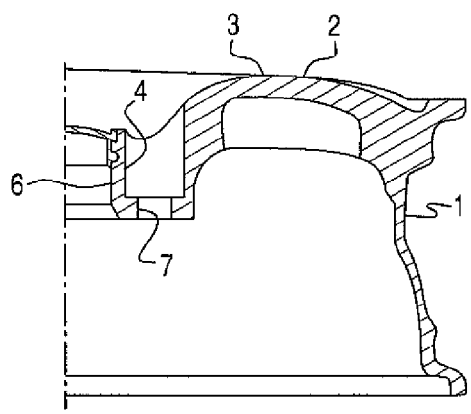
FIG. 2 is a partial cross-sectional view of rim and disk portions of the wheel taken along section line II-II in FIG. 1.
Figure 3:
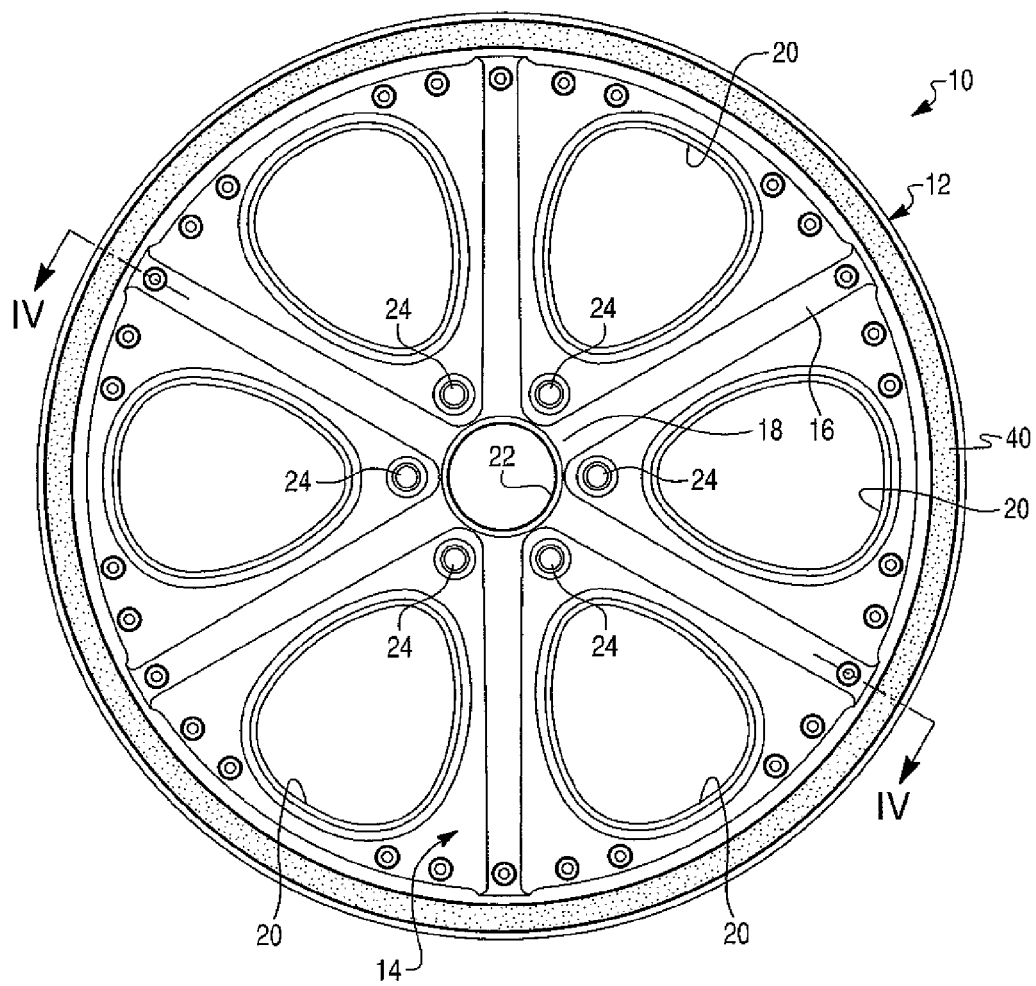
FIG. 3 is a front view of a vehicle wheel assembly according to the present invention.
Figure 4:
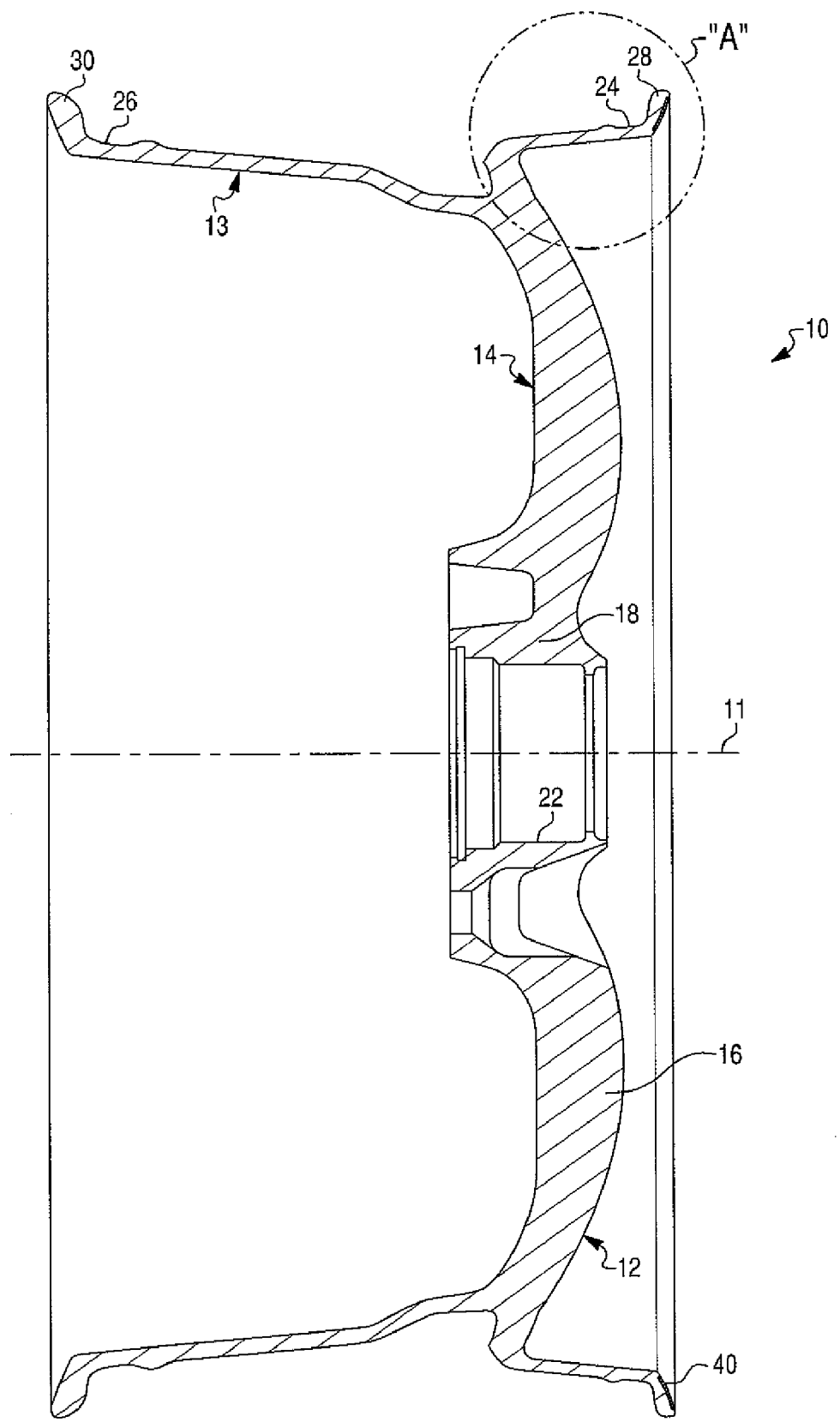
FIG. 4 is a cross-sectional view of the vehicle wheel assembly according to the present invention taken along section line IV-IV in FIG. 3.
Figure 5:
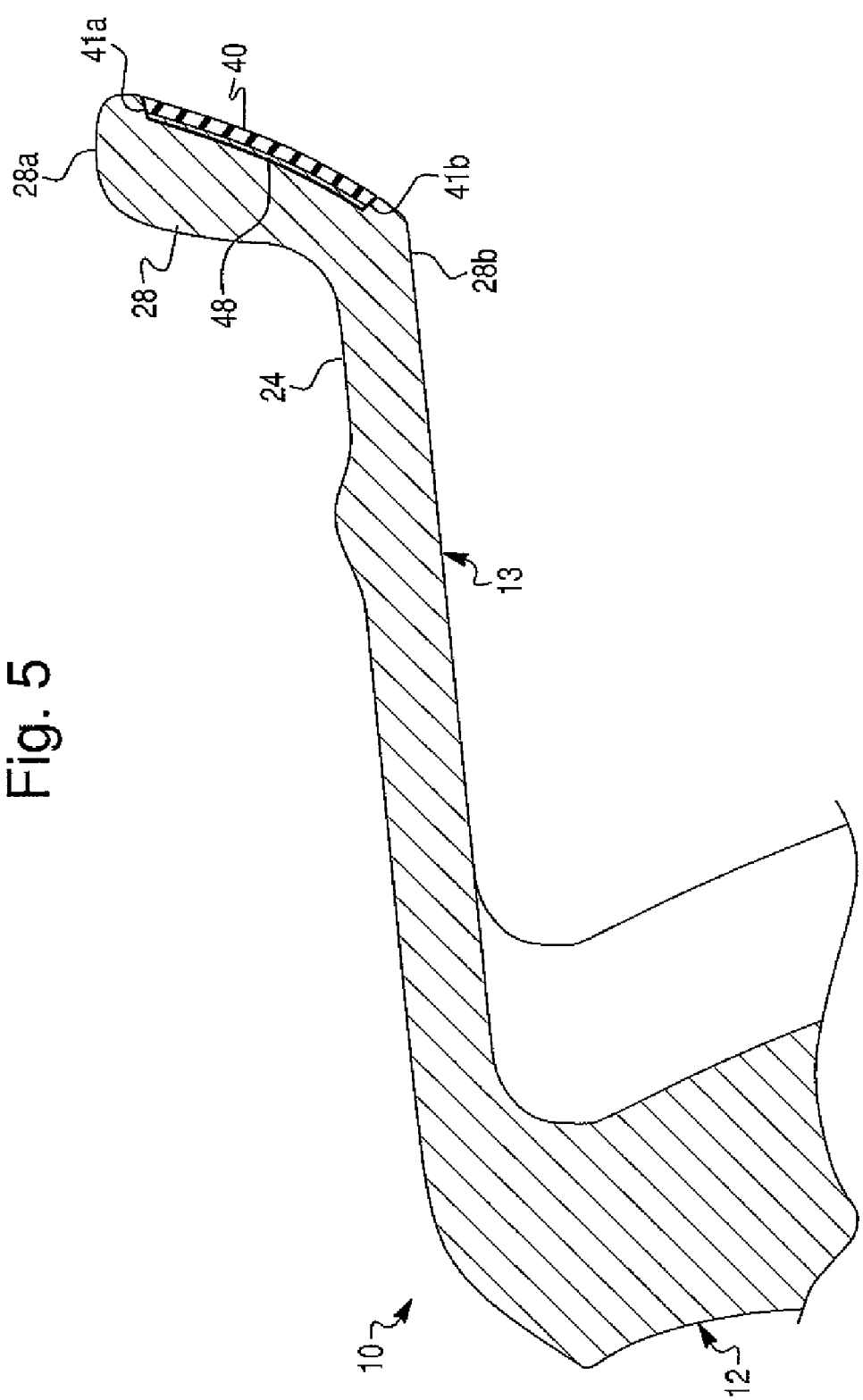
FIG. 5 is enlarged partial sectional view of the vehicle wheel assembly according to the present invention shown in a circle "A" in FIG. 4.

FIGS. 3-5 show a vehicle wheel assembly 10 according to the preferred embodiment of the present invention that includes a vehicle wheel 12 and an annular transition member 40 mounted to the vehicle wheel 12.

Figure 6:
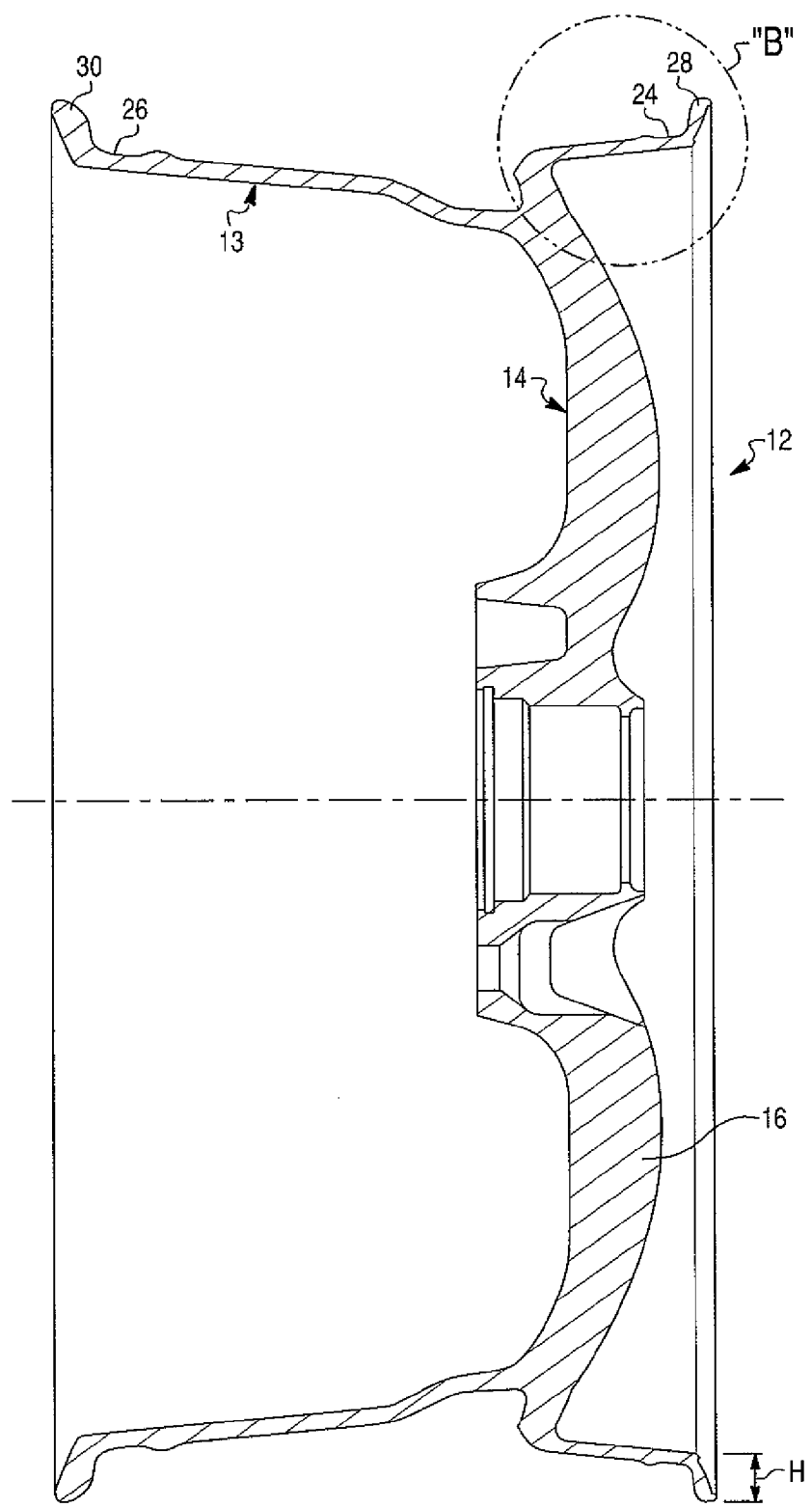
FIG. 6 is a cross-sectional view of a vehicle wheel according to the present invention.
Figure 7:
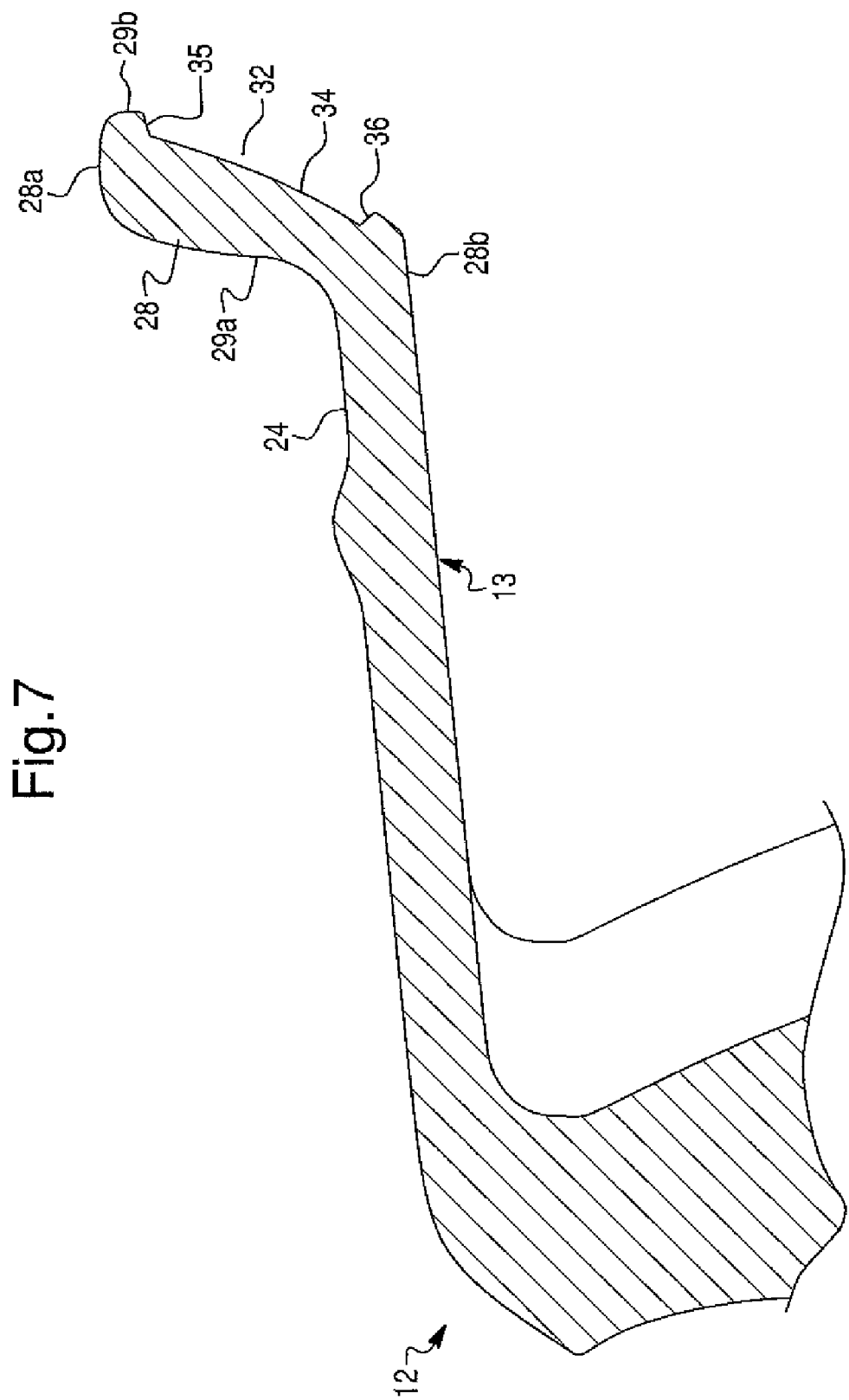
FIG. 7 is enlarged partial sectional view of a rim portion the vehicle wheel assembly according to the present invention shown in a circle "B" in FIG. 6.

The vehicle wheel 12, illustrated in FIGS. 6 and 7, has a central axis 11 and includes an annular rim portion 13 concentric to the central axis 11 of the wheel 10 and a disk portion 14 extending radially inwardly from the rim portion 13. The disk portion 14 includes a plurality of spoke portions 16 and a central hub portion 18. Decoration holes 20 are formed between adjacent spoke portions 16. In the hub portion 18, a hub hole 22 concentric with the central axis 11 is formed and a plurality of bolt holes 24 are circumferentially formed surrounding the hub hole 22.

As illustrated in FIGS. 4 and 6, the annular rim portion 13 has outboard and inboard bead seats 24 and 26, respectively, for mounting a pneumatic tire (not shown) thereon. The pneumatic tire is mounted to the rim portion 10 in a manner that is well known to those of skill in the art. The rim portion 13 defines an annular outboard rim flange 28 extending radially outwardly from the outboard bead seat 24 and an annular inboard rim flange 30 extending radially outwardly from the inboard bead seat 26 and disposed opposite the outboard rim flange 28. It will be appreciated that the outboard rim flange 28 is visible from the outside of a vehicle when the wheel is mounted to the vehicle.

As illustrated in detail in FIG. 7, the outboard rim flange 28 has an annular, axially inner peripheral surface 29a facing the inboard rim flange 30 and an annular, axially outer peripheral surface 29b disposed opposite the inner peripheral surface 29a and facing away from the inboard rim flange 30. It will be appreciated that the axially outer peripheral surface 29b of the outboard rim flange 28 is visible from the outside of the vehicle when the wheel 10 is mounted to the vehicle. The height of the outboard rim flange 28, measured in the radial direction is indicated by dimension H, as illustrated in FIG. 6. Specifically, the height of the outboard rim flange 28 is defined herein as a distance between radially outer and inner circumferential edges 28a and 28b, respectively, of the outboard rim flange 28.

The outboard rim flange 28 of the wheel 10 is provided with an annular retention groove 32 formed on the outer peripheral surface 29b of the outboard rim flange 28 concentrically to the central axis 11. It will be appreciated that the retention groove 32 is formed by any appropriate means known in the art, such as by machining, forging or during the casting of the wheel 10. As illustrated in detail in FIG. 7, the annular retention groove 32 is substantially U-shaped in cross-section and forms an open annular cavity defined by an annular base wall 34, and outer and inner (in the radial direction) concentric annular side walls 35 and 36, respectively, both extending axially outwardly from the base wall 34 which is formed concentric to the central axis 11. Preferably, as can be seen in FIGS. 6 and 7, the outer side wall 35 of the annular retention groove 32 is radially inwardly spaced from the radially outer edge 28a of the outboard rim flange 28, while the inner side wall 36 of the annular retention groove 32 is radially outwardly spaced from the radially inner edge 28b of the outboard rim flange 28.

The annular transition member 40 of the wheel assembly 10 is in the form of a continuous, uninterrupted ring, as shown in FIGS. 3-5, 8, 9 and 10A. Preferably, the annular transition member (or transition ring) 40 is made of flexible plastic material. Alternatively, the transition ring 40 can be made of a flexible metallic material, or rigid plastic or metallic material. Further preferably, as illustrated in detail in FIG. 8, the transition member 40 has a radially uniform height h defined as a half of a difference between outer and inner diameters D and d, respectively, thereof. The annular transition member 40 of the wheel assembly 10 is securely mounted (attached) to the outer peripheral surface 29b of the outboard rim flange 28 of the wheel 10 concentrically to the central axis 11. More specifically, the transition member 40 is securely mounted in the retention groove 32 in the outboard rim flange 28 concentrically to the central axis 11. For this purpose, the annular transition member 40 is sized to fit within the annular retention groove 32 in the outboard rim flange 28 of the vehicle wheel 12, as shown in FIGS. 3-5. As can be seen in FIGS. 3-5, the height h of the annular transition member 40 (shown in detail in FIGS. 8 and 9) is less than the height H of the outboard rim flange 28 of the vehicle wheel 12 (shown in FIG. 6). More specifically, as shown in FIGS. 3-5, an outer peripheral edge 41a of the annular transition member 40 is spaced radially inwardly from the outer edge 28a of the outboard rim flange 28, while an inner peripheral edge 41b of the annular transition member 40 is spaced radially outwardly from the inner edge 28b of the outboard rim flange 28.

As further illustrated in FIGS. 9 and 10A, preferably, the transition member 40 is formed with a curved annular, axially inner surface 42 that is designed to match the surface of the base wall 34 of the retention groove 32 to which the transition member 40 is affixed. In other words, the axially inner surface 42 of the annular transition member 40 is formed complementary to the base wall 34 of the retention groove 32. Further preferably, the transition member 40 is mounted in the retention groove 32 so that the transition member 40 is flush with the outer peripheral surface 29b of the outboard rim flange 28 as shown in FIGS. 4 and 5.

Figure 10B:
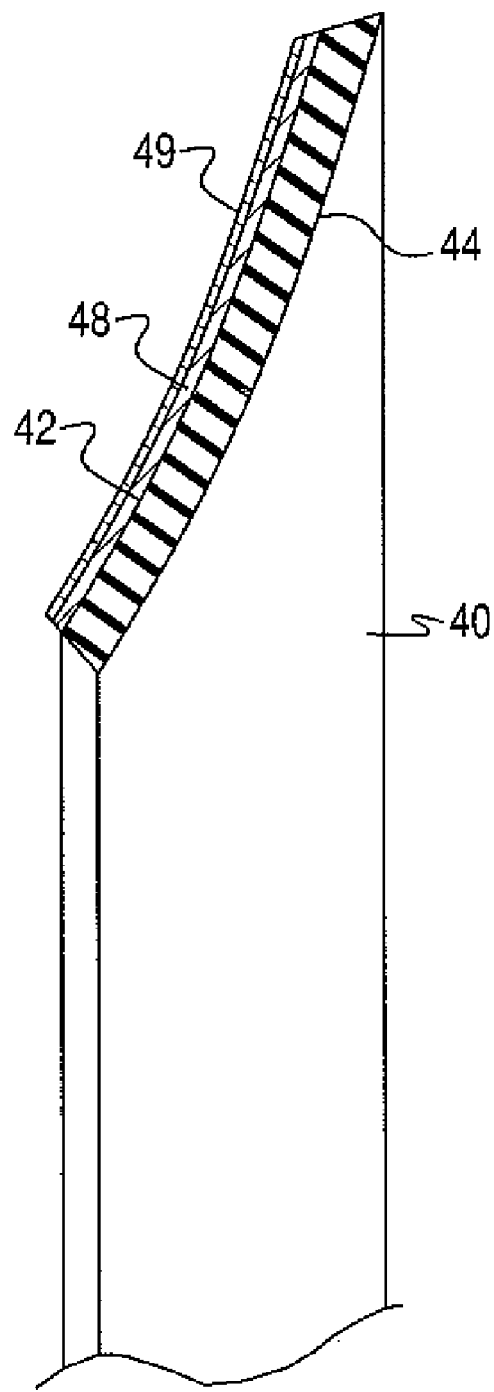
FIG. 10B is an exploded view of a cross section of the annular transition member shown in a circle "C" shown with an adhesive layer and a protective plastic film.

In the preferred embodiment, as illustrated in FIGS. 5 and 10B, the ring member 40 is adhered to the outer peripheral surface 29b of the outboard rim flange 28 by a two-sided (double-coated) removable adhesive layer 48 disposed on the axially inner surface 42 of the transition member 40 that abuts the base wall 34 of the retention groove 32. In other words, the transition member 40 is self-secured within the annular retention groove 32. Further preferably, the double-coated adhesive layer 48 is made from a straight, elongated double-coated adhesive tape one elongated edge of which is provided with a plurality of wedge-shaped notches. One side of the double-coated adhesive layer 48 is attached to the inner surface 42 of the ring member 40 by bending the adhesive tape into annular shape complementary to the inner surface 42 of the ring member 40. A non-adhesive, axially outer (exposed) surface 44 of the ring member 40 is facing the observer. It would be appreciated that the wedge-shaped notches of the adhesive tape make it flexible and facilitate bending thereof. Preferably, as further illustrated in FIG. 10B, when the ring member 40 is initially supplied (i.e., prior to attaching to the outboard rim flange 28), the adhesive layer 48 on the inner surface 42 is covered with a removable colored transparent protective plastic film 49 or the like which will prevent the adhesive surface from adhering to related objects or sticking together, but, when removed, will allow the ring member 40 to be applied to the outboard rim flange 28 of the wheel 10. It is also envisioned that the ring member 40 may be affixed to the outboard rim flange 28 of the vehicle wheel 12 by mechanical means such as small rivets or a retention groove that lock the ring member in place on the wheel. For example, the transition ring 40 could be designed as a member that snap-fits into the retention groove 32.

One important consideration for the transition ring member 40 is the utilization of different colors to enhance the visual effect of the wheel assembly 10 of this invention. The colors for the transition ring member 40 may be chosen and matched for different wheel styles and colors (e.g., chrome, silver, stainless steel, black, and combination of the same). The color of the ring member 40 (e.g., red, black, yellow, green, etc.) may also be chosen for different tire styles. In order to further enhance the visual effect of the wheel assembly 10 of this invention, a color of the transition ring member 40 may be chosen to be different than the color of the vehicle wheel 12. With the preferred embodiment, the transition ring member 40 is removable and replaceable to permit the user/owner to change and adapt the wheel assembly of this invention.

The transition ring member 40 is preferably made of plastic but it is envisioned that the ring member may be metal or metallic in appearance or other suitable material for the environment typical for vehicle wheels. Likewise, the ring member 40 may be chrome, stainless steel, matte black or other popular wheel appearance. It also is envisioned that the ring member is sold as a kit which would include a set of the ring members 40 having different colors.

While the foregoing invention has been shown and described with reference to a preferred embodiment and configuration, it will be understood by those of skill in the art that various changes in form and detail may be made therein without departing from the spirit and scope of the present invention. For example, the ring member 40 may include a company logo, advertisement or other ornamentation to the axially outer (exposed) surface 44 of the ring member 40.

What is claimed is:

1. A vehicle wheel assembly comprising:

a wheel having a central axis, an annular rim portion having outboard and inboard bead seats for mounting a pneumatic tire thereon and a disk portion extending radially inwardly from said rim portion, said disk portion including a central hub portion provided with a plurality of lug mounting apertures extending therethrough;

said rim portion defining an annular outboard rim flange extending radially outwardly from said outboard bead seat and an annular inboard rim flange extending radially outwardly from said inboard bead seat and disposed opposite said outboard rim flange;

said outboard rim flange having an annular inner peripheral surface facing said inboard rim flange and an annular outer peripheral surface disposed opposite said inner peripheral surface and facing away from said inboard rim flange;

said outboard rim flange having an annular retention groove formed on said outer peripheral surface of said outboard rim flange concentrically to said central axis; and an annular transition member mounted in said annular retention groove in said outboard rim flange of said wheel;

said annular retention groove forming an open annular cavity defined by an annular base wall and outer and inner concentric annular side walls extending axially outwardly from said base wall;

said annular transition member having an annular, axially inner surface complementary to said annular base wall of said annular retention groove preformed prior to being inserted into said retention groove so as to be mounted in said annular retention groove without being deformed;

wherein said outer side wall of said annular retention groove is radially inwardly spaced from a radially outer edge of said outboard rim flange, and wherein said inner side wall of said annular retention groove is radially outwardly spaced from a radially inner edge of said outboard rim flange.

2. The vehicle wheel assembly as defined in claim 1, wherein said annular, axially inner surface of said annular transition member has a curvature complementary to said base wall of said annular retention groove leaving no air gap between said annular base wall of said annular retention groove and said axially inner surface of said annular transition member.

3. The vehicle wheel assembly as defined in claim 1, wherein said annular transition member is mounted in said annular retention groove so that said annular transition member is flush with said outer peripheral surface of said outboard rim flange.

4. A vehicle wheel assembly comprising:

a wheel having a central axis, an annular rim portion having outboard and inboard bead seats for mounting a pneumatic tire thereon and a disk portion extending radially inwardly from said rim portion, said disk portion including a central hub portion provided with a plurality of lug mounting apertures extending therethrough;

said rim portion defining an annular outboard rim flange extending radially outwardly from said outboard bead seat and an annular inboard rim flange extending radially outwardly from said inboard bead seat and disposed opposite said outboard rim flange;

said outboard rim flange having an annular inner peripheral surface facing said inboard rim flange and an annular outer peripheral surface disposed opposite said inner peripheral surface and facing away from said inboard rim flange;

said outboard rim flange having an annular retention groove formed on said outer peripheral surface of said outboard rim flange concentrically to said central axis; and an annular transition member mounted in said annular retention groove in said outboard rim flange of said wheel;

said annular retention groove forming an open annular cavity defined by an annular convexly curved base wall and outer and inner concentric annular side walls extending axially outwardly from said base wall;

said annular transition member having an annular, axially inner surface complementary to said annular base wall of said annular retention groove preformed prior to being inserted into said retention groove so as to be mounted in said annular retention groove without being deformed.

5. The vehicle wheel assembly as defined in claim 4, wherein said annular, axially inner surface of said annular transition member has a concave curvature complementary to said convexly curved base wall of said annular retention groove leaving no air gap between said annular base wall of said annular retention groove and said axially inner surface of said annular transition member.

* * * * *